US008434095B2

(12) United States Patent
Yu

(10) Patent No.: US 8,434,095 B2
(45) Date of Patent: Apr. 30, 2013

(54) MICROBLOGGING BASED DYNAMIC TRANSACTION TRACKING FOR COMPOSITE APPLICATION FLOW

(75) Inventor: Jean X. Yu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 12/644,042

(22) Filed: Dec. 22, 2009

(65) Prior Publication Data

US 2011/0154370 A1 Jun. 23, 2011

(51) Int. Cl.
G06F 13/00 (2006.01)
(52) U.S. Cl.
USPC .......................................... 719/313; 719/318
(58) Field of Classification Search .................. 719/313, 719/318
See application file for complete search history.

(56) References Cited

U.S. PATENT DOCUMENTS

| | | | |
|---|---|---|---|
| 7,519,658 B1 | 4/2009 | Anglin et al. | |
| 2006/0277457 A1 | 12/2006 | Salkind et al. | |
| 2007/0050620 A1* | 3/2007 | Pham et al. | 713/165 |
| 2007/0121523 A1* | 5/2007 | Morandin | 370/252 |
| 2008/0021976 A1 | 1/2008 | Chen et al. | |
| 2008/0172409 A1* | 7/2008 | Botros et al. | 707/103 R |
| 2008/0222097 A1 | 9/2008 | Jania et al. | |
| 2009/0094345 A1 | 4/2009 | Kang et al. | |
| 2009/0112935 A1 | 4/2009 | Hefta-Gaub | |
| 2009/0172635 A1 | 7/2009 | Auriemma et al. | |
| 2009/0217287 A1 | 8/2009 | Blum et al. | |
| 2009/0276263 A1 | 11/2009 | Deb et al. | |
| 2009/0276500 A1 | 11/2009 | Karmarkar | |
| 2010/0185590 A1* | 7/2010 | D'Angelo et al. | 707/674 |

OTHER PUBLICATIONS

"tweetymail: User Guide," Dec. 3, 2009, tweetymail.com, pp. 1-3, retrieved from www.archive.org.*
Smarty, Ann, "How to Search Twitter—the Advanced Guide," Nov. 20, 2008, Search Engine Journal, pp. 1-9, retrieved from www.archive.org.*
Mayernik et al.; "Microblogging from the Field: Capturing Contextual Information in Highly Mobile Research"; Center for Embedded Networked Sensing (CENS) Statistics and Data Team, UCLA; Aug. 2009.
Lennon, Joe; "Leveraging Pure XML in a Flex Microblogging Application, Part 2: Building the Application User Interface with Flex"; IBM DeveloperWorks article; Oct. 2009.
Passant et al.; "Microbloggong: A semantic and Distributed Approach"; Science Foundation Ireland under grant No. SFI/02/CE1/I131; 2008.
Gaonkar et al.; "Micro-Blog: Sharing and Querying Content Through Mobile Phones and Social Participation"; MobiSys'08, Jun. 17-20, 2008, Breckenridge, Colorado; Jun. 2008.
Owiger et al.; "Mobile Blogging System"; IEEE Computer Society; 2008.
Assogba et al.; "Mycrocosom: Visual Microblogging"; IEEE Proceedings of the 42nd Hawaii International Conference on System Sciences; 2009.

* cited by examiner

Primary Examiner — Andy Ho
(74) Attorney, Agent, or Firm — Brevetto Law Group

(57) ABSTRACT

Using microblogging to dynamically track event flow of a composite enterprise application by reporting an enterprise application event. A client server detects an event of the complex enterprise application, and encodes the event data in a microblog compatible format. The client computer creates an event post message containing the event data and uploads the event post to a microblog server via the Internet. The microblog server then displays the post message in a user readable format.

19 Claims, 4 Drawing Sheets

MICROBLOGGING BASED DYNAMIC TRANSACTION TRACKING FOR COMPOSITE APPLICATION FLOW

BACKGROUND

The revenue generating capabilities of many businesses depends upon the operation of complex enterprise application software systems. Software system failures, glitches and slowdowns can be very costly. Therefore, it can be critical for the survival of a company that depends upon an enterprise application software system such as an on-line service provider to quickly identify the root cause of a problem when customers are experiencing service outages or slow response times attempting to make on-line purchases or accessing on-line services.

SUMMARY

Embodiments disclosed herein address the above stated needs by providing methods, systems and computer products for using microblogging to dynamically track event flow of a composite enterprise application by reporting an enterprise application event. In accordance with various embodiments a client server detects an event of the enterprise application, and encodes event data associated with the event in a microblog compatible format. The client computer creates an event post message containing the event data, and uploads the event post message to a microblog server via the Internet. The microblog server then displays the post message in a user readable format.

BRIEF DESCRIPTION OF THE DRAWINGS

The accompanying drawings, which are incorporated in and constitute part of the specification, illustrate various embodiments disclosed herein. Together with the general description, the drawings serve to explain the principles of the various embodiments. In the drawings.

DETAILED DESCRIPTION

Figure 1:
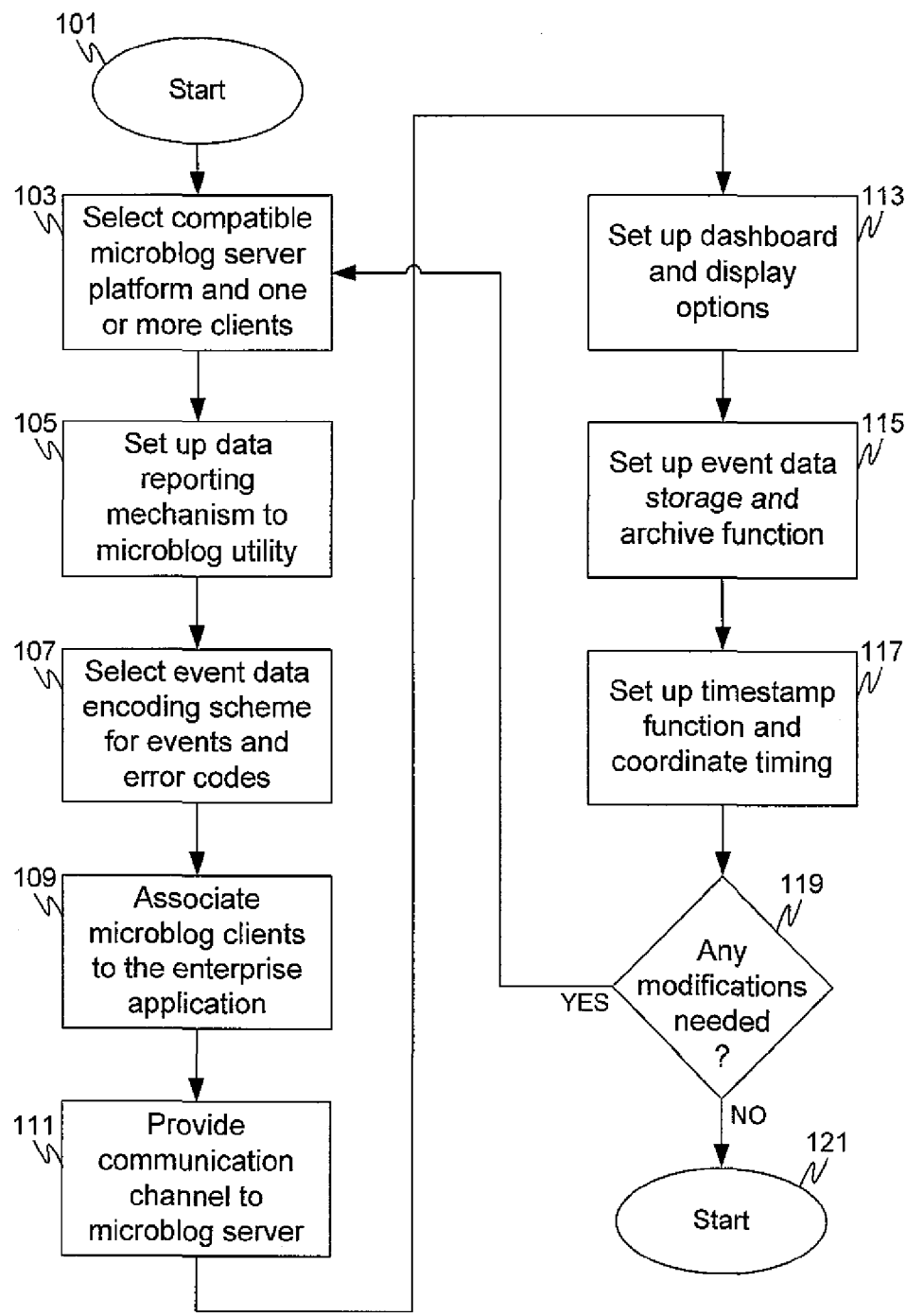
FIG. 1 is a flowchart of activities for setting up the microblogging based dynamic transaction tracking system according to various embodiments.

The present inventor recognized a need for a robust, streamlined tracking system to detect faults in complex enterprise software systems. Software professionals and information technology (IT) organizations are called upon to maintain a complex set of heterogeneous systems hosting a big stack of software products from various vendors. Each of the products in the stack requires unique administration tasks. The various vendor products often differ in their capability to monitor and diagnose problems. It can sometimes be a challenge to understand the inter-system dependency and the impact to the business of system outages. One existing transaction tracking tool available is Tivoli Composite Application Manager. The present inventor recognized that this conventional product must pass correlation IDs along with application context from the edge transaction to sub-sequent transactions (sub-transactions) in order to operate. Because of this requirement all the applications in the transaction flow must be instrumented with complex correlation structures of monitoring interfaces in order to use the Tivoli Composite Application Manager. Quite often this is not possible since most enterprise environments use applications from various vendors having different platforms/versions. This can have serious consequences since missing the correlation ID in even a single hop means the entire approach will not work. Furthermore, the correlation of timestamps of various instrumentation points in the systems distributed in many different time zones results in additional complexity for the conventional Tivoli system.

Various embodiments disclosed herein are suitable for tracking the event flow in a complex composite enterprise application. A composite enterprise application may send data to/from and interact with several different applications through various communications channels and having different compatibility and interfacing constraints. At least some of the various embodiments use a command line based microblogging client that collects/converts event data from various sources such as audit logs, plug-in, static or dynamic instrumentations. Microblogging is a form of blogging service that allows its users to send and read other users' updates, which may be text or micromedia (e.g., photos or audio clips) based posts. The parameters may be set so the microblog can either be viewed by anyone or else be viewed only by a restricted group specified by the user. A good example of such a service is Twitter. The content of a microblog is typically quite small in size, with updates on any topic at any given moment. One use for microblogs is to share news about a company's products and services.

In accordance with various embodiments the microblogging client runs on the same machine as the application, but outside of the application process space. In this way it does not interfere with the normal application flow. This client posts text messages to microblogging hosting services. The posting typically includes application specific information, e.g. application alias, host alias, thread-id, response time, status code. The reported information can be customized to accommodate the situation. The information is correlated in time by the hosting service with its centralized timestamp. Since each posting contains IDs, spatial correlation can be achieved by filtering based on the content of the blogging. That is, each posting is linked to a specific client ID, and each client ID is associated with a physical client machine, spatial correlation can be achieved by filtering using the client IDs.

The various embodiments are less prone to causing a system failure than conventional approaches. In the microblog approach of the various embodiments if some of the less important hops in the transaction cannot be instrumented with the microblogging client, transaction information for the rest of the flow can still be tracked. The various embodiments are also more amenable to checking and recording execution of the associated enterprise application system. From the microblogging hosting site, the top level dashboard view with key services level indicators of key applications can be implemented with an entry microblog page. More detailed drill-down views into the transaction flow can be implemented as links to follower pages, or sublevels, of the entry microblog page. To facilitate the creation and configuration of views and data review a tool may be provided to make HTTP connections to the microblog service page. In addition to Twitter other microblogging services can be used to host the services suggested above. For example, some of the available microblogging tools that may be modified to implement the various embodiments include StatusNet, identi.ca, NotePub, Laconica, Jaiku, Qaiku, Jott, ReVou, Present.ly, Yammer, ShoutEm, Twidge, Twingr, SocialCast, Kantter, Ping.fm, Posty or other like services, tools, plug-ins or platforms. Alternatively, social networking platforms such as Facebook or MySpace may be modified to carry out aspects of the various embodiments.

The various embodiments offer end transaction tracking without requiring instrumentation of all applications, simple time correlation and content based correlation by the hosting server, and automatically provides real-time tracing for IT support staff without requiring access to customers' internal systems. As such, the various embodiments are less intrusive and more robust than conventional tracking approaches since no correlation ID is required to be passed along with the execution context. The posting of tracking information is straightforward to implement and generic enough to support all applications. The microblogging client can collect event from any data sources from any application without requiring existing applications to implement new components/adaptors. System administrators can view tracking status from any devices with Internet access and a browser (e.g., a cell phone, PDA, or the like).

FIG. 1 is a flowchart 100 of activities for setting up the microblogging based dynamic transaction tracking system according to various embodiments. The method begins at 101 and proceeds to 103 to select a compatible microblog server platform and one or more clients. The microblog clients are the code, plug-ins or modules that capture the event data and convey it back to the microblog server (which may be called the microblog hosting server) for posting. The microblog clients may be implemented as command line based microblogging clients that collect and convert event data from various sources (e.g., from applications) making up the complex enterprise application software system. The microblog server gathers the event data from various microblog clients. The microblog server typically has a dashboard, or other display configuration, for displaying the status messages based on status code received from the microblog clients, and an archive for storing the received event data messages. Entities and relationships presented by the microblog server are accounts and linkage between accounts. An individual account can display data from a list of other accounts by "following" them, or otherwise setting a parameter to specify the accounts the user is interested in tracking. The dashboard is typically presented as the "home" of the application administrator account. Microblog clients are also registered with the microblog server as independent accounts. The administrator can specify from which microblog clients to collect data by "following" these microblog client accounts. If a dashboard client follows additional lower level clients that contribute to its transaction, a drill-down view into those lower level clients can be displayed in this dashboard client's home page.

Upon completing 103 to select a microblog server platform and clients the method proceeds to 105 to set up the mechanism for reporting the event data from the microblog clients back to the microblog server. A complex enterprise application software system may include, or interact with, a big stack of software products from various vendors. Therefore, the microblog server may need the capability to interact with various different types of platforms, modules, plug-ins or other software or code. This can be done either in the microblog server platform itself or in the microblog clients. The data gathered by the microblog clients may be in the form of text or ASCII data. In some embodiments special provisions may be made to additionally collect image data, including for example, screenshots showing user interaction taken during an event or in the midst of a failure. Keystroke logs may also be captured by the microblog clients and sent back to the microblog server. The microblog server platform may be configured to accept posts from the various microblog clients in different formats, and then translate them into one consist form of data for posting. On the other hand, the various microblog clients may each be tailored to gather data and convert it into one single, consistent format to be sent to the microblog server platform. In other words, the conversions, if any are required, may either be performed in the microblog server platform once the post messages are received from the clients, or may be performed within the microblog clients themselves before the post messages are uploaded to the microblog server platform.

Part of block 105 may entail identifying the different sources of available event data and setting up various microblog clients to collect, convert and forward the event data. The event data may come from audit logs, error handling records or databases, flow monitoring plug-ins, static instrumentations, dynamic instrumentations, or any other source of event data known to those of ordinary skill in the art. A complex enterprise application software system may include and/or interface with many other applications. Microblog clients may be distributed in different parts of the complex enterprise application itself, as well as the various applications that interface with it. The microblog clients may be set up to report (e.g., upload/send a post message) either upon the occurrence of an event or may be set up to report periodically based on the passage of a predefined period of time, number of clock cycles, or the occurrence of some observable/measurable item (e.g., a voltage, number of dollars, or other definable amount reaching a certain level).

Upon completing 105 the method proceeds to 107 to select an event data encoding scheme. Block 107 involves setting up the format for the post, that is, the messages to be uploaded from the microblog client to the microblog server. The messages include application specific information such as application alias, host alias, thread-id, response time, status code and timestamp information. Block 107 may also involve selecting an encoding scheme for event data and error codes. One characteristic of many microblog clients is that the size of the messages sometimes quite constrained. For example, Twitter is limited to sending text-based posts—or "tweets"—of no more than 140 characters. Other microblogging services may have different limits associated with them, e.g., 200 characters, 1 k characters, or a size limit such as 1 kbyte, 100 kbyte, or the like. Various embodiments may feature post messages limited to values of a character limit or post size of anything up to and including 1,000 characters or 100 kbytes. The event data may not always fit within the constraints of the microblog client message limit. This can be overcome in two different manners. One solution is for the microblog clients can be set up to send the full set of event data, using a series of multiple tweets if necessary. Another solution is to encode lengthy event data strings at the microblog client end, send the shorter encoded tweet messages, and then decode them at the microblog server end for posting or displaying. A combination of these two solutions may be used. Some shorter event data strings may be sent in their entirety, while other longer data strings may be encoded. Since the microblog clients may be sending different types and formats of event data and error codes, it may be desirable to adopt different encoding schemes for the various clients to best suit the implementation of each one. One other consideration is that, in general, it may not always be necessary or desirable to send the full text of event data. Since all messages have unique IDs, those reviewing data at the microblog server may only need to look at the message ID. Hence, the client may not need to send the entire text in every instance. Once the various encoding schemes are determined in 107 (or it is decided that no encoding is to be used), the schemes are stored within the microblog server and in each applicable microblog client.

Upon completing 107 the method then proceeds to 109 to associate the various microblog clients with the enterprise application software system and the microblog server. The associating may also entail providing access for the microblog client to the event data of the enterprise application. The microblog client may need a recognized identity or address, a password, or other sort of authorization code to be granted access to the event data. The microblog client runs on the same computer as the application, but outside of the application process space. This typically facilitates access to the application's event data. Once the various microblog clients have been associated with the enterprise application software system and the microblog server the method proceeds from 109 to 111.

Block 111 involves setting up a communication channel between the various microblog client and its microblog server. This typically involves providing Internet access to the microblog client and to the microblog server. Depending on the complexities of the organizations communication system, Internet access may be gained by access through an intranet or other network of the organization, or by setting up another channel of communication between the microblog clients and its microblog server. The complex enterprise application software systems may consist of, or interface with, many different applications operating on different domains or in different computers or servers. Because of this some of the different microblog clients may need to have varying types of communication channels back to the microblog server. For example, some microblog clients may communicate their post messages using a short message system (SMS) communication system, text messaging via a cellular telephone system, or any other like type of communication system or method suitable for sending text messages or image content as known by those of ordinary skill in the art. Post messages may be "uploaded" from a microblog client to a microblog server using any of these types of communication. Once the various communication channels are set up for the microblog clients in 111 the method proceeds to 113.

Block 113 involves setting up the display options for the blogging server. In at least some embodiments the microblog server may be accessed via a website portal. The microblog server site may be set up to display a top level dashboard view with services level indicators for the various enterprise applications being monitored. These can be formatted as microblog pages, drop-down or pop-up views, or any other data display format deemed appropriate by the web designer or IT manager. More detailed drill-down views into the transaction flow may be accessed via links or within attached pages under the microblog entry. Once the dashboard and display options are set up in 113 the method proceeds to 115.

Block 115 involves specifying and setting up the storage and archiving features. The storage policy may be to simply keep all of the event data received at the microblog server. This may be an acceptable policy in many instances since the volume of received data is not likely to be onerous. Much of the data will be in the form of brief text messages, and will take up an almost negligible amount of storage space. In the event image data or other, more storage intensive formats are collected, it may be necessary to limit the time the collected data is kept. A policy may be set to discard data after a certain number of days, months, years or other time frame. Alternatively, the total amount of saved data may be specified. Once the total allowed data storage is filled up the data can be discarded on a first in-first out basis to constantly erase the oldest event data being stored for any given enterprise application software system. Once the storage and archive functions are specified in block 115 the method proceeds to 117.

In 117 the timestamp function is set up. Timestamps for the various received event data messages are useful in tracking down system errors and failures. The various post messages from different microblog clients can be correlated in time by the hosting service with its centralized timestamp. Since some of the microblog clients may be reporting from different locations, and possibly through different communication channels, the central microblog server may be configured to adjust the timestamps based on transmission delay (or other communication time) to increase the accuracy of the timing from different reporting components. The timestamp activities in 117 may involve the development of timestamp adjustment factors to account for the transit time of post messages from various different locations. It should be noted that timestamp data from the enterprise application may be incorporated into the event data of the post message. However, the centralized microblog server typically keeps track of the received post messages using its own centralized timestamp system. Once the timestamp function has been provisioned in 117 the method proceeds to 119.

In block 119 it is determined whether the overall microblogging based dynamic event transaction tracking system is operating properly to collect, convert and post data from the various microblog clients to the central microblog server. If modifications are needed the method proceeds from 119 along the "YES" path back to 103 to implement the needed adjustments. However, if it is determined in block 119 that the system is operating correctly to collect and report the enterprise application events and error codes then the method proceeds from 119 along the "NO" branch to 121 where the method ends.

Figure 2:
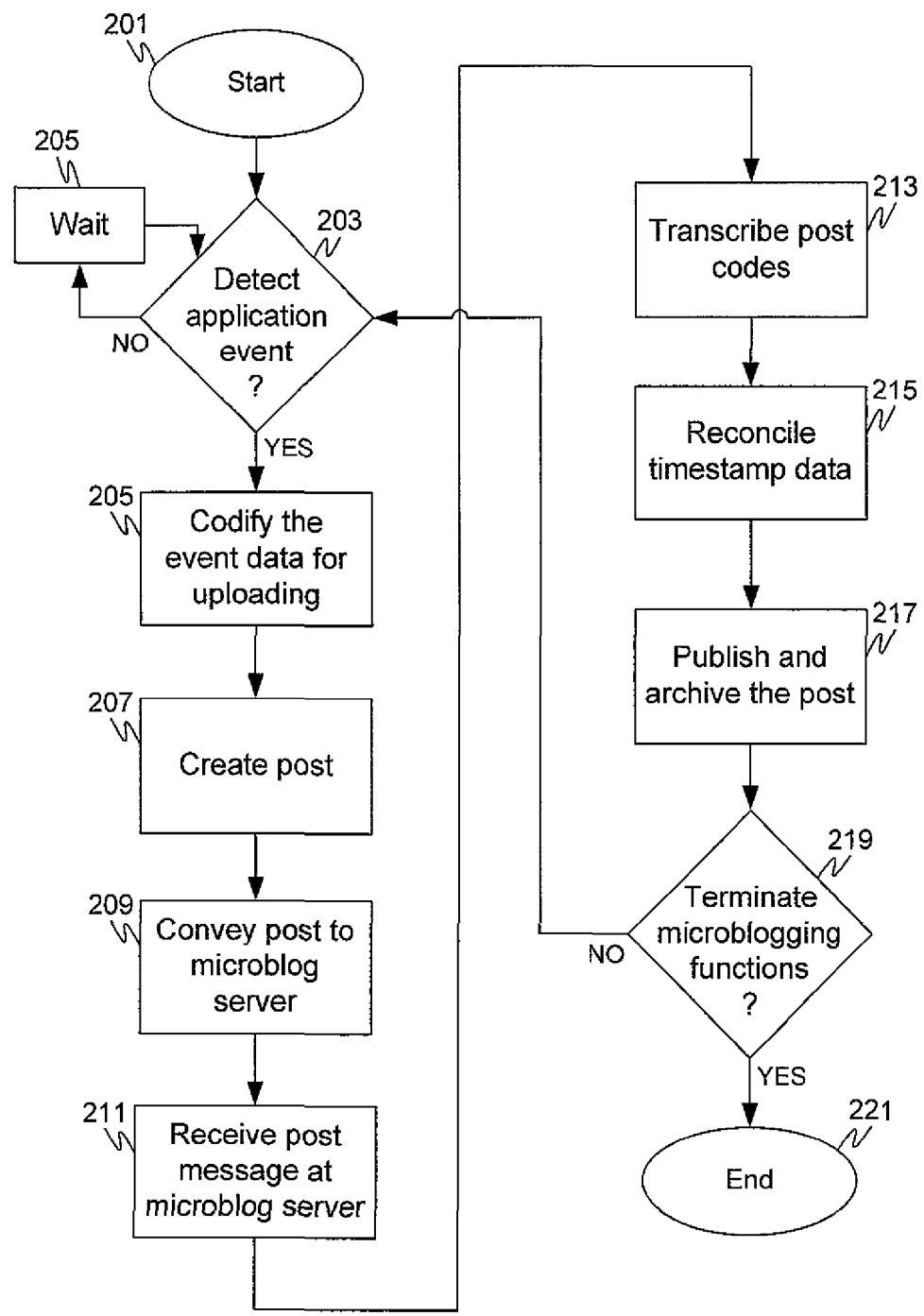
FIG. 2 is a flowchart depicting activities involved in the capture, conversion and posting of an event code using the microblogging based dynamic transaction tracking system according to the various embodiments.

FIG. 2 is a flowchart 200 depicting activities involved in the capture, conversion and posting of an event code using the microblogging based dynamic transaction tracking system according to the various embodiments. The method begins at 201 and proceeds to 203 to determine whether a recordable event has occurred in the enterprise application. This may be determined by the various microblog clients distributed throughout the enterprise application. The microblog clients either detect events for which data is to be collected, or may gather data at predetermined time intervals. If no enterprise application event has occurred the microblog client continues to wait, and the method loops around from 203 to 205 and back. Up detecting the occurrence of an application event for which data is to be gathered the method proceeds from 203 along the "YES" path to 205.

In 205 the event data is characterized in a microblog compatible format. In some embodiments this may entail populating the post message with the event data in the format it is received from the application. Sometimes, however, the data is too large to be included in a post message. In such instances 205 may involve converting the event data into a format suitable for uploading or otherwise transmitting from the microblog client to the central microblog server. Since the message post size may be limited (e.g., 140 characters) the data may be encoded into a more concise format for uploading. Once the event data has been converted or otherwise codified into a format suitable for uploading the method proceeds from 205 to 207. Block 207 involves creating the post, an activity that involves formatting the event data into a form suitable for uploading so it will be accepted by the central blogging server. The formatting may include provisioning the post message with a header, address, and/or control information, in addition to putting the codified event data into the post message. In some implementations the post message may be encoded for security purposes. Once the post has been created in 207 the method proceeds to 209.

In block 209 the microblog client uploads, or otherwise transmits, the post to its centralized microblog server. To do this the microblog client may need to be logged in or have permissions in place to access the microblog server. Typically, such permissions are attended to ahead of time, before attempting to upload the post—for example, in step 109 of FIG. 1. In some embodiments, however, the microblog may need to log in each time a post is made. This may be the case in situations where it is difficult to continuously keep an open communication channel between the microblog client and the microblog server. Once the microblog client has completed uploading the post to its microblog server in 209 the method proceeds to 211.

In block 211 the centralized microblog server receives uploaded post message from the microblog client. Upon receiving the post, the method proceeds to 213 where the post is transcribed or otherwise decoded. Depending upon the specifics of the implementation the event data of the post message may be encoded, for example, due to size constraints in the post message structure (e.g., 140 character limit, or other size constraints imposed on the post messages). Post messages from different microblog clients may be encoded in differing manners due to the varying nature of the different applications serving functions within the complex enterprise application. Therefore, post messages from different microblog clients may be encoded using different encoding schemes. A first microblog client may use one encoding scheme while a second microblog client uses another encoding scheme. The encoding scheme may be as simple as a straightforward lookup table with text abbreviations for the different event data error codes and other pieces of status information. Other, more complicated encoding schemes may also be employed in the post messages. Once the received post message has been transcribed in 213 the method proceeds to 215.

In block 215 the centralized microblog server timestamps the post as a way of organizing the post for future reference. The timestamping process may involve applying a factor to compensate for delay in uploading the post message from the microblog client, or other known system delays. The timestamps are often useful later when IT professionals are trying to recreate or understand the interaction of various application in trying to track down and solve a system problem within the complex enterprise application software system. The event data of the post message may also contain timing information from the application of origin. This information, if any, may also be useful to IT professionals. However, for the purposes of organizing the received post messages the microblog server uses its own centralized timestamping function. Once the post message has been timestamped in 215 the method proceeds to 217.

In 217 the microblog server publishes or otherwise displays the post based on the post message received from the microblog client. The "publishing" of the post entails making it available for viewing. In the event there are no error codes and the enterprise application is running smoothly it is quite possible that the post will go unread even though it has been published by the microblog server. Once a post is published an authorized user may log in and view the post, or the post may be downloaded, emailed or otherwise communicated to IT professionals to aid in maintaining, repairing or understanding the operation of the enterprise application software. The publishing of the post may involve displaying it on a page of a website along with other, similar posts from the same application in a format suitable for user's to read. Once the post has been published the method proceeds from 217 to 219. In 219 it is determined whether the microblogging functions are to continue. In some situations it doesn't make sense to continue receiving post messages and performing the microblogging functions of the microblog server and associated microblog clients. For example, if the complex enterprise application software system is down for maintenance, upgrading or replacement, then the microblogging based dynamic transaction tracking system may also be shut down. To continue operation of the microblogging system the method proceeds from 219 along the "NO" path back to 203 to wait for another reportable event to be detected. However, to halt the operation of the microblogging system the method proceeds from 219 along the "YES" path to 221 where the method ends.

Figure 3:
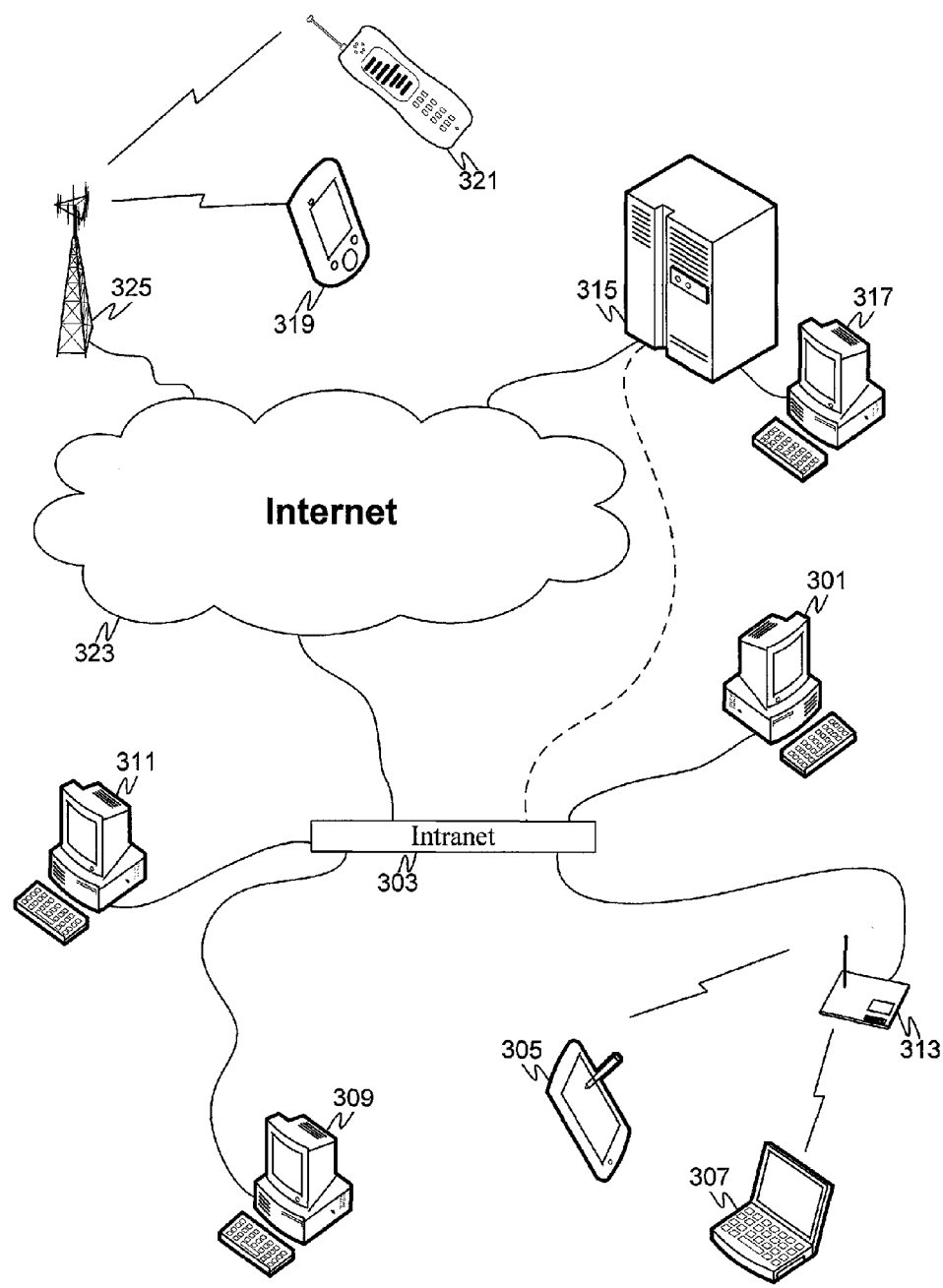
FIG. 3 depicts an example of an information system typical of those on which a microblogging based dynamic transaction tracking system would be installed and implemented according to various embodiments.

FIG. 3 depicts an example of an information system 300 typical of those on which a microblogging based dynamic transaction tracking system would be installed and implemented according to various embodiments. The enterprise application software system of an organization may be implemented on a number of different computers, servers, terminals or other devices for receiving input or displaying/providing information or outputs. For example, the system 300 of FIG. 3 may have enterprise application software installed and running on computer system 301. The computer system 301 may be connected to a number of different devices throughout the company via a network such as intranet 303. For example, the enterprise application system may receive inventor inputs from a tablet notebook 305 in the shipping and receiving area, or from a laptop computer 307 in the warehouse area.

Laptops 307 and tablet computers 305 are often connected to the organization's IT system via a wireless node 313, or other such wireless portal within the company. The organization may take telephone orders which are logged into an operator's computer 309 and then communicated to the primary computer system 301 on which the enterprise software resides via the intranet 303 or other network of the company. The organization may have a computer 311 dedicated to ordering supplies and inventory, the inputs of which are communicated back to computer system 301. Typically, a company's network, in this case the intranet 303, is connected to the outside world via the Internet 323.

The enterprise software system may also receive inputs from devices outside the company's IT system, for example, from computers connected via the Internet 323 or from portable computing devices often carried by employees. For example, salesmen often carry a personal digital assistant (PDA) 319 or else a cellular telephone 321. The devices may connect back to the enterprise software system on computer system 301 through a cellular telephone network 325. Other remote devices may be connected through the landline PSTN system. Any of these computing or communication devices of the organization may have a role in the enterprise software system, and therefore may be outfitted with a microblog client to report back event data to the microblog server 315.

The microblog server 315 is connected to the Internet 323 for communicating with the organization's IT system. In some instances the microblog server 315 may be directly connected to the company's network (e.g., intranet 303) as shown by the dotted line in order to communicate with the various computing devices involved in running and collecting data of the enterprise application software. Microblog server 315 itself is connected to another computer system 317, or a terminal, through which an operator can maintain the system and see results of the program on a display device. Alternatively the microblogging based dynamic transaction tracking system on microblog server 315 may be accessed from another computer (e.g., computer 301) via the Internet 323.

Figure 4:
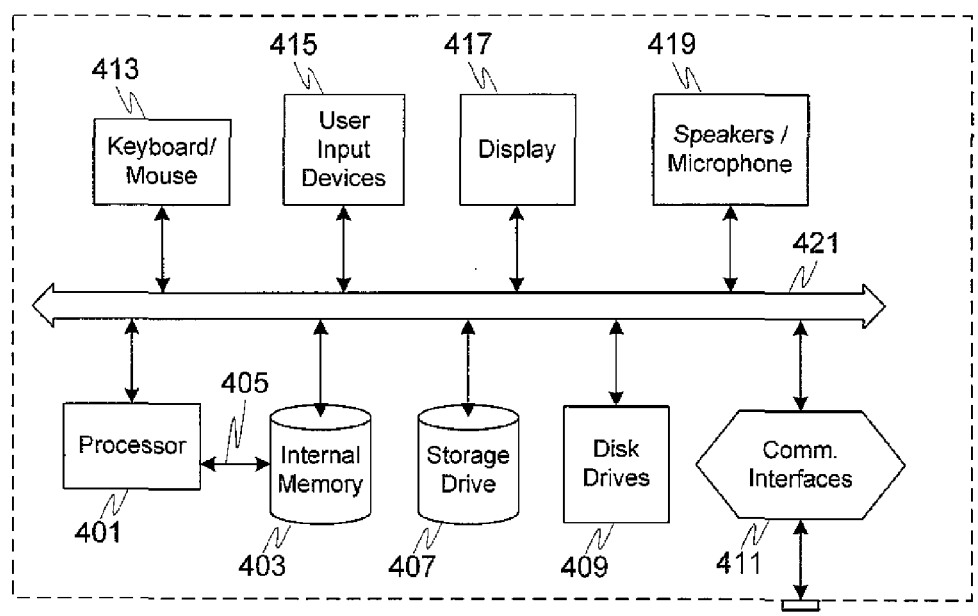
FIG. 4 depicts further details of a computer system suitable for implementing various embodiments.

FIG. 4 depicts further details of a computer system 400 suitable for implementing various embodiments. The computers depicted in FIG. 3 may contain some or all of the components or features of the computer system 400. The computer system 400 may be configured in the form of a desktop computer such as the computer 429, a laptop computer such as laptop 433, a mainframe computer, or any other hardware or logic arrangement capable of being programmed or configured to carry out instructions. The computer system 400 may be located and interconnected in one location, or may be distributed in various locations and interconnected via communication links such as a local or wide area network (LAN or WAN), via the Internet 423, via the public switched telephone network (PSTN), a cellular telephone network 425, a wireless node 435, or other such communication links. Other devices may also be suitable for implementing or practicing the embodiments, or a portion of the embodiments. Such devices include personal digital assistants (PDA), wireless handsets 427 (e.g., a cellular telephone or pager), and other such consumer electronic devices preferably capable of being programmed to carry out instructions or routines.

Computer system 400 includes a processor 401 which may be embodied as a microprocessor, two or more parallel processors, central processing unit (CPU) or other such control logic or circuitry. The processor 401 is configured to access an internal memory 403, generally via one or more busses such the system bus 421. The internal memory 403 may include one or more of random access memory (RAM), read-only memory (ROM), cache memory, or a combination of these or other like types of circuitry configured to store information in a retrievable format. In some implementations the internal memory 403 may be configured as part of the processor 401, or alternatively, may be configured separate from it but within the same packaging. The processor 401 may be able to access internal memory 403 via a different bus or control lines (e.g., local bus 405) than is used to access the other components of computer system 400.

The computer system 400 also includes, or has access to, one or more storage drives 407 (or other types of storage memory) and floppy disk drives 409. Storage drives 407 and the floppy disks for floppy disk drives 409 are examples of machine readable (also called computer readable) mediums suitable for storing the final or interim results of the various embodiments. The floppy disk drives 409 may include a combination of several disc drives of various formats that can read and/or write to removable storage media (e.g., CD-R, CD-RW, DVD, DVD-R, floppy disk, or the like). The computer system 400 may either include the storage drives 407 and floppy disk drives 409 as part of its architecture (e.g., within the same cabinet or enclosure and/or using the same power supply), as connected peripherals, or may access the storage drives 407 and floppy disk drives 409 over a network, or a combination of these. The storage drive 407 is often a hard disk drive configured for the storage and retrieval of data, computer programs or other information. The storage drive 407 need not necessarily be contained within the computer system 400. For example, in some embodiments the storage drive 407 may be server storage space within a network that is accessible to the computer system 400 for the storage and retrieval of data, computer programs or other information. In some instances the computer system 400 may use storage space at a server storage farm, or like type of storage facility, that is accessible by the Internet 423 or other communications lines. The storage drive 407 is often used to store the software, instructions and programs executed by the computer system 400, including for example, all or parts of the computer application program for carrying out activities of the various embodiments.

The computer system 400 may include communication interfaces 411 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The computers system 400 may be connected to the Internet via the wireless router 401, or a wired router or other such access node (not show). The components of computer system 400 may be interconnected by a bus 421 and/or may include expansion slots conforming to any of various industry standards such as PCI (Peripheral Component Interconnect), ISA (Industry Standard Architecture), or EISA (enhanced ISA).

Typically, the computer system 400 includes one or more user input/output devices such as a keyboard and/or mouse 413, or other means of controlling the cursor represented by the user input devices 415 (e.g., touchscreen, touchpad, joystick, trackball, etc.). The communication interfaces 411, keyboard and mouse 413 and user input devices 415 may be used in various combinations, or separately, as means for receiving information and other inputs to be used in carrying out various programs and calculations. A display 417 is also generally included as part of the computer system 400. The display may be any of several types of displays, including a liquid crystal display (LCD), a cathode ray tube (CRT) monitor, a thin film transistor (TFT) array, or other type of display suitable for displaying information for the user. The display 417 may include one or more light emitting diode (LED) indicator lights, or other such display devices. In addition, most computer systems 400 also include, or are connected to, one or more speakers and microphones 419 for audio output and input. Speech recognition software may be used in conjunction with the microphones 419 to receive and interpret user speech commands.

Various activities may be included or excluded as described above, or performed in a different order, while still remaining within the scope of at least one of the various embodiments. For example, reconciling the timestamp data of 215 may be performed as soon as the message post is detected, rather than after decoding the post message in step 213. Other steps or activities of the methods disclosed herein may be omitted or performed in a different manner while remaining within the intended scope of at least one embodiment. The method may be implemented through the addition and manipulation of circuitry to a design, hence is applicable for analysis using logic evaluation frameworks such as logic simulators or formal verification routines, as well as hardware-based frameworks such as hardware emulators/accelerators and even fabricated chips.

The various embodiments may be implemented with any sort of processing units, processors and controllers (e.g., processor 401 of FIG. 4) capable of performing the stated functions and activities. For example, the processor 401 may be embodied as a microprocessor, microcontroller, DSP, RISC processor, two or more parallel processors, or any other type of processing unit that one of ordinary skill would recognize as being capable of performing or controlling the functions and activities described herein. A processing unit in accordance with at least one of the various embodiments can operate computer software programs stored (embodied) on computer-readable medium such those compatible with the disk drives 409, the storage drive 407 or any other type of hard disk drive, CD, flash memory, ram, or other computer readable medium as recognized by those of ordinary skill in the art.

The computer software programs can aid or perform the steps and activities described above to use microblogging to dynamically track event flow of a composite enterprise application by reporting an enterprise application event. For example computer programs in accordance with at least one of the various embodiments may include: source code for detecting an event of the enterprise application; source code for encoding event data associated with the event in a microblog compatible format; source code for creating an event post message containing the event data; and source code for providing the event post message from the microblog server to a microblog server. There are many further source codes that may be written to perform the various steps, activities and procedures disclosed above that are intended to lie within the scope of the various embodiments. Various activities may be included or excluded as described above, or performed in a different order, with the rest of the activities still remaining within the scope of at least one exemplary embodiment.

The description of the various embodiments provided above is illustrative in nature inasmuch as it is not intended to limit the invention, its application, or uses. Thus, variations that do not depart from the intents or purposes of the invention are intended to be encompassed by the various embodiments of the present invention. Such variations are not to be regarded as a departure from the intended scope of the present invention.

What is claimed is:

1. A software product comprising one or more non-transitory machine readable mediums including executable instructions, wherein the instructions upon being executed on at least one computer causes the at least one computer to perform activities comprising:
    detecting a first event of an enterprise application, wherein the enterprise application is associated with an organization and comprises a plurality of software programs, each of the plurality of software programs being from a different vendor;
    characterizing event data associated with the first event into formatted first event data that is in a microblog compatible format of no more than 140 characters in length suitable for uploading to a microblog server;
    creating a first event post message by a first microblog client, the first event post message containing said formatted first event data;
    uploading the first event post message from the first microblog client to the microblog server;
    detecting a second event of the enterprise application, the second event being an error in executing the enterprise application;
    converting data associated with the second event into formatted second event data in the microblog compatible format;
    creating a second event post message by a second microblog client, the second event post message containing the formatted second event data with information about said error; and
    uploading the second event post message from the second microblog client to said microblog server.

2. The software product of claim 1, wherein the microblog server is configured to display an event post based on the first event post message on a computer display in a format suitable for user viewing.

3. The software product of claim 1, further comprising:
    timestamping the first event post message by the microblog server.

4. The software product of claim 3, wherein the enterprise application is configured to perform and report results of the organization's operations, wherein the timestamping further comprises:
    applying a timestamp adjustment based on transmission delay of the first event post message from the first microblog client to the microblog server.

5. The software product of claim 1, wherein the first event post message is uploaded via the Internet.

6. The software product of claim 1, wherein event data associated with the second event is a data string longer than 140 characters in length and said converting converts the data string to an abbreviated error code of no more than 140 characters, said second event post message containing the abbreviated error code.

7. The software product of claim 6, wherein the event data associated with the first event is in a different initial format that the event data associated with the second event;
    wherein the first event is from a first software program among the plurality of software programs and is sent via a first communications channel, the first software program being from a first vendor; and
    wherein the second event is from a second software program among the plurality of software programs and is sent via a second communications channel, the second software program being from a second vendor.

8. The software product of claim 7, the activities further comprising:
    logging the second microblog client on to the microblog server in response to detecting the second event.

9. The software product of claim 8, wherein the first event is an order for a good or service produced by the organization, the event data associated with the second event being entered into a computer by an employee of the organization.

10. A microblogging system for an enterprise application, the system comprising:
    a computer bus of a first microblog client configured to communicate event data associated with a first event of the enterprise application, wherein the enterprise application is associated with an organization and comprises a plurality of software programs, each of the plurality of software programs being from a different vendor;
    memory of the first microblog client configured to store instructions for the microblogging system and the event data associated with the first event;
    a processor configured to execute the instructions to convert the event data associated with the first event into formatted first event data that is in a microblog compatible format of no more than 140 characters in length, the instructions further being configured for creating a first event post message containing said formatted first event data;
    a first communication interface configured to upload the first event post message from the first microblog client to a microblog server; and
    a second microblog client configured to upload a second event post message to the microblog server, the second event post message comprising converted event data from a second event;
    wherein the microblog server is configured to display an event post based on the first event post message on a computer display in a format suitable for user viewing.

11. The system of claim 10, wherein the second microblog client comprises:
   means for detecting the second event of the enterprise application, the second event being an error in executing the enterprise application; and
   a machine readable storage device configured to store instructions for converting event data associated with the second event into the microblog compatible format;
   wherein the second event data is a data string longer than 140 characters in length and said converting converts the data string to an abbreviated error code of no more than 140 characters, said second event post message containing the abbreviated error code.

12. The system of claim 11, wherein the event data associated with the first event is in a different initial format that the event data associated with the second event;
   wherein the first event is from a first software program among the plurality of software programs and is sent via a first communications channel, the first software program being from a first vendor; and
   wherein the second event is from a second software program among the plurality of software programs and is sent via a second communications channel, the second software program being from a second vendor.

13. The system of claim 12, wherein the instructions stored on the machine readable storage device further comprise instructions for:
   logging the second microblog client on to the microblog server in response to detecting the second event.

14. The system of claim 13, wherein the first event is an order for a good or service produced by the organization, the first event being entered into a user input device by an employee of the organization.

15. A microblogging system for an enterprise application, the microblogging system comprising:
   a non-transitory storage device configured to store one or more of a plurality of software programs of the enterprise application, the enterprise application being associated with an organization, wherein each of the plurality of software programs is from a different vendor;
   a communication interface of a microblog server configured to communicate with a first microblog client via a first communication channel and a second microblog client via a second communication channel;
   a processor of said microblog server configured to execute instructions for receiving a first event post message concerning a first event from the first microblog client and a second event post message concerning a second event from the second microblog client, the first event post message and the second post message each being in a microblog compatible format of no more than 140 characters in length; and
   a display of the microblog server configured to display information of the first and second event post messages in a format suitable for user viewing.

16. The microblogging system of claim 15, wherein said instructions are further configured to allow the second microblog client to log on to the microblog server in response to detecting the second event.

17. The microblogging system of claim 16, wherein the first event is an order for a good or service produced by the organization, data associated with the first event being entered into a computer by an employee of the organization.

18. The microblogging system of claim 17, wherein the second event is an error in executing the enterprise application, and the second post message contains an abbreviated error code of no more than 140 characters based on a data string describing the error which is longer than 140 characters in length.

19. The microblogging system of claim 18, wherein event data associated with the first event is in a different initial format that event data associated with the second event;
   wherein the first event is from a first software program among the plurality of software programs and is sent via the first communications channel, the first software program being from a first vendor; and
   wherein the second event is from a second software program among the plurality of software programs and is sent via the second communications channel, the second software program being from a second vendor.

* * * * *